United States Patent [19]

Daubenbüchel et al.

[11] 4,382,761
[45] May 10, 1983

[54] CONTROLLING AN EXTRUSION BLOWING PROCESS

[75] Inventors: Werner Daubenbüchel, Bergisch-Gladbach; Dieter Hess, Swisttal-Morehoven, both of Fed. Rep. of Germany

[73] Assignee: Krupp-Kautex Maschinenbau GmbH, Bonn, Fed. Rep. of Germany

[21] Appl. No.: 191,963

[22] Filed: Sep. 29, 1980

[30] Foreign Application Priority Data

Oct. 5, 1979 [DE] Fed. Rep. of Germany ....... 2940418

[51] Int. Cl.³ .............................................. B29C 17/07
[52] U.S. Cl. .................... 425/140; 264/40.1; 264/40.4; 264/40.7; 264/541; 425/150; 425/532
[58] Field of Search ............... 425/140, 150, 532; 264/40.1, 40.4, 40.7, 541

[56] References Cited

U.S. PATENT DOCUMENTS

| | | | |
|---|---|---|---|
| 3,583,031 | 6/1971 | Holzmann et al. | 18/5 |
| 3,611,494 | 10/1971 | Feuerherm | 18/14 R |
| 3,759,648 | 9/1973 | Hunkar | 425/140 |
| 3,795,719 | 3/1974 | Morecroft et al. | 264/40 |
| 3,865,913 | 2/1975 | Lachner et al. | 425/150 X |
| 3,943,214 | 3/1976 | Turek | 264/40 |
| 4,088,721 | 5/1978 | Apicella, Jr. | 264/40.4 |
| 4,094,620 | 6/1978 | Daubenbüchel et al. | 425/140 |
| 4,097,566 | 6/1978 | Bertin, et al. | 264/40.7 |

FOREIGN PATENT DOCUMENTS

| | | |
|---|---|---|
| 2608551 | 9/1977 | Fed. Rep. of Germany . |
| 1360576 | 7/1974 | United Kingdom ............ 264/40.1 |
| 1560423 | 2/1980 | United Kingdom . |

OTHER PUBLICATIONS

German Periodical "Plastverarbeiter," PV (23), 1972/1, p. 56.
"Vorträge der Fachtagung Extrusionblastformen," 1972.

Primary Examiner—Jan H. Silbaugh
Attorney, Agent, or Firm—Seidel, Gonda, Goldhammer & Panitch

[57] ABSTRACT

In extrusion blowing a hollow member, a preform is extruded and then blown in a mold to produce the final member. The weight of the hollow member is determined after its removal from the mold and compared to a reference value, thereby to adjust the size of the extrusion discharge opening to control the amount of material in the preform. The length of the preform is detected to control the movement of the mold thereby to keep a substantially constant length of extruded preform, while the time required to produce a preform is also maintained at a substantially constant value.

18 Claims, 2 Drawing Figures

CONTROLLING AN EXTRUSION BLOWING PROCESS

BACKGROUND OF THE INVENTION

In a known form of apparatus for controlling the weight of a hollow member which is produced from for example thermoplastic synthetic resin by an extrusion blowing process, a preform, for example of a tubular configuration, is continuously extruded from an extrusion head connected to the output of a screw press, the preform being extruded through a slot-like discharge opening in the extrusion head. After the preform has been blown in a blow mold into the required form of hollow member, the weight of the hollow member is established and compared to a desired or reference value, and the width of the discharge opening of the extrusion head is adjusted in dependence on the result of the comparison operation, in order to regulate the volume of the material used to form the preform.

When producing preforms which are of a tubular configuration, the opening in the extrusion head is generally in the form of an annular slot. As this is the situation which arises most frequently in practice, it will be assumed in the specification hereinafter, for the sake of simplicity, that the preform to be produced is of a generally tubular configuration, and that the discharge opening of the extrusion head is thus in the form of an annular slot. It will be appreciated however that the present invention may also be used in relation to preforms which are of a different configuration, for example which are of a film or foil nature.

For the purposes of producing a satisfactory final product, for example a bottle, canister or the like, the preform which must be of a minimum length must comprise a certain minimum amount of material which must also be properly distributed over the length of the preform, so as to have a uniform and correct wall thickness. In this respect, the minimum amount of material which is required to make a satisfactory product should not be exceeded, or should not be exceeded to a substantial degree, as otherwise a greater amount of material than is necessary from the technical point of view would then be consumed. It will of course be appreciated that in general the preform will always be longer than the corresponding length of the blow mold cavity, the excess material being squeezed out by the blow mold and/or the means for feeding the blowing pressure agent, for example a blowing mandrel. However, the waste or excess portion can generally be recycled. On the other hand, an excess of material which is due to the preform being of excessive wall thickness cannot be recuperated as the excessive wall thickness is still to be found in the hollow member so that the wall thickness of the hollow member is greater than necessary. In other words, economical production requires that the wall thickness and thus the weight of the preform must be properly influenced and controlled, as correct wall thickness and thus correct weight and correct volume are necessary conditions if the hollow member, as the final product of the process, is not to include a greater amount of material than the amount strictly required to perform its technical function.

When the article is produced by means of an arrangement including an extrusion head with a storage chamber from which the molding material can be emptied by means of a piston, the requirement for establishing a given length of material for each preform, being the same length from one working cycle to the next, does not give rise to any difficulty as the amount of material used in each preform is precisely established by virtue of the volume of the storage chamber remaining unaltered. In that case it is only necessary for the width of the slot forming the discharge opening of the extrusion head to be set in such a way that the given amount of material is so distributed thereover as to ensure that the preform has the minimum amount of material required to produce a satisfactory final product.

When however continuously extruding a preform, there is no possibility of precisely determining the amount of material in each preform, by way of an interposed storage chamber in the extrusion head, as just referred to above.

One form of apparatus which has been disclosed for controlling the weight of a hollow member produced from thermoplastic material by an extrusion blowing process, of the general kind outlined above has not fulfilled the expectations placed on it. This is essentially because, although the entire operating procedure and movements of the blowing mold and the parts thereof are rigidly controlled in respect of time, and the speed of rotation of the screw of the press is constant, fluctuations can arise in regard to the conveying output in each unit of time and thus also the speed of preform discharge. This is essentially because there are operating in the extruder many other influencing parameters which also influence each other. These parameters are for example the apparent or bulk density, temperature, viscosity and swelling characteristics of the material. The preforms are thus of different lengths and possibly weights, with the result that the preforms tend to suffer from elongation phenomena which vary in dependence on the weight of the preforms; such phenomena have the result that, even when the overall weight of the finished hollow member corresponds to the reference or desired weight, the distribution of material within the hollow member may be so uneven or irregular that the end product is useless. This for example is to be attributed to the fact that, in spite of the preform being of the proper wall thickness, the amount and thus weight of material which issues from the discharge slot of the extrusion head in each unit of time fluctuates and consequently the respective sections of the preforms which are to be accommodated in the mold cavity undergo varying degrees of extension. In this case, the preform would be found to be of excessively low or excessively high weight, even though the width of the discharge slot was correctly set. A further disadvantage of such apparatus is that, when using a time-dependently programmed control for the distribution of wall thickness of the preform over the length thereof, the individual regions of the preform do not always occupy the proper position relative to the mold. In this case, the apparatus cannot achieve useful control in respect of the weight of the end product.

SUMMARY OF THE INVENTION

An object of the invention is to provide a process and apparatus for influencing the weight of a hollow member produced from thermoplastic material by extrusion blowing, in such a way as to at least substantially reduce the above-indicated disadvantages.

A further object of the present invention is to provide such a process and apparatus for sufficiently accurately controlling the wall thickness of a preform, by controlling the width of the discharge opening of the extrusion head of the apparatus, in order to keep the weight of the finished product as close as possible to a predetermined reference weight.

Another object of the invention is to ensure that inevitable irregularities in operation of the extrusion press can be detected and compensated.

Yet another object of the invention is to provide apparatus for controlling the weight of an extrusion-blown thermoplastic member, which enables the length of the preforms and the time required for production thereof to be established at least to such an extent that fluctuations are only within narrow limits, from one working cycle to another.

A still further object of the invention is to provide a process for controlling the weight of a hollow member produced by extrusion blowing from thermoplastic synthetic resin, which permits a preform of uniform wall thickness to be produced.

These and other objects are achieved by a means for detecting the length of the preform and triggering in response thereto a signal for controlling the movements of the blow mold or mold sections, and a control means for keeping substantially constant the time in which a preform is produced.

The means for detecting the length of the preform and for triggering movements of the blowing mold or sections thereof ensures that at the time that the mold is closed, the preform is always of at least substantially the same length. The signal from such means is desirably triggered when the mold is in a partly or completely open condition in a preform-receiving station as in that case the moment at which the signal is triggered and the moment at which the preform assumes its desired length are very close together. However, it is also possible for the signal from the length-detecting means to be triggered at an earlier moment so as to initiate movements of the blowing mold which occur before the mold-closing movement, such movements being for example movement of the mold from the station in which the molded article is removed from the mold, back into the preform-receiving station. Such movements are then followed by all other movements which are still required for the operation of closing the mold.

The control means for keeping substantially constant the time required for forming the preform ensures that, although the moment at which the mold is closed is no longer rigidly determined or fixed, but on the contrary depends on production of the preform, the cycle times do not fluctuate, or, if they do fluctuate, then such fluctuation is within narrow limits. The desired aim of maintaining constant the time required for producing the preform is advantageously achieved by means of suitable control of the speed of rotation of the screw of the extruder press. However, it is also possible to envisage other steps, for example a change in the temperature in the extruder and/or other controlling parameters. The control means for keeping the above-mentioned period of time at a substantially constant value also takes account of the fact that a change in the width of the slot forming the discharge opening of the extrusion head will normally also result in a change in the speed of discharge of the preform. If it is assumed that the extruder has a constant output capacity, then for example a reduction in the width of the discharge slot will mean that, for a given output capacity, the material flows through the discharge slot at a higher speed. Conversely, increasing the width of the discharge opening results in a reduction in the speed of discharge, with a uniform output of material. In other words, whenever the change in the width of the discharge opening exceeds a certain degree, additional steps normally have to be taken in order to ensure that the time required for producing a preform does not substantially change. This can be achieved by a means for detecting the speed of extrusion, for example in such a way that the moment at which the preform attains its desired or reference length is compared to a desired or reference moment in time and, in dependence on the result of the comparison operation, the speed of rotation of the screw either remains unaltered or is adjusted to a higher or lower speed. However, it is also possible optionally to provide a further means for varying the speed of rotation of the extrusion screw directly in dependence on the change in the width of the discharge slot and thus the detected weight of the hollow member, such change being for example such that certain changes in the width of the discharge slot are accompanied by certain matching changes in the speed of rotation of the screw. For the purposes of detecting other influencing parameters such as fluctuations in temperature, a change in the viscosity of the material or the like, it is also possible to use the above-mentioned means for regulating the speed of rotation of the screw, in dependence on the speed of extrusion, and thus the moment at which the preform attains its desired length.

Controlling the speed of screw rotation in dependence on the setting of the discharge slot or in dependence on the detected deviation in weight of the hollow members from the desired weight gives the advantage that the interval between production of a hollow member and detection of the weight thereof can possibly be reduced by a working cycle. In this respect, it should be observed that it is generally desirable, after the width of the discharge opening has been adjusted for the purposes of controlling the weight of the finished article, that the respective following operation of comparing the weight of the hollow member to the reference weight should be performed no earlier than after a period of time which corresponds to the number of working cycles which occur between the moment of production of a hollow member and the moment of establishing the weight of said hollow member. This is based on recognition of the fact that the effect of a change in the width of the discharge opening, for the purposes of controlling the weight of the hollow member, can be studied or ascertained at the earliest only when the weight of the first hollow member which was produced after the width of the slot had been changed has been established. Ascertaining the weight of a hollow member directly after the change in the width of the discharge opening would have the result that that detection operation would be in relation initially to hollow members which had been produced effectively at an earlier time, that is to say, before the width of the discharge opening was altered.

The above-indicated mode of operation takes account of the fact that it would not be possible, or would be possible only with very great difficulty, for the weight of the hollow member to be established in the mold or at the moment that the molded article is taken out of the mold.

Controlling the speed of extrusion for the purposes of compensating for the change in discharge speed, caused by a change in the width of the discharge opening, by means of a device for detecting the period of time required for producing the preform, can have the result that it is necessary to wait at least a further working cycle before the weight of the hollow member can be determined and compared to the desired or reference value; this is because adapting the speed of extrusion to the freshly adjusted width of discharge opening requires the production of an additional preform after the operation of adjusting the discharge slot or opening width, that is to say, an additional working cycle.

Apart from this however, it may in any case be advantageous for the operation of comparing the weight of the member to a desired or reference weight, after a change in the speed of extrusion, to be performed only when the first hollow member produced after stabilization of the extruder operating conditions is available for the operation of detecting the weight thereof. Whether and to what extent a change in the speed of extrusion, e.g. the speed of rotation of a screw, causes the operating conditions of the extruder to become unstable depends on the respective circumstances involved, in particular the extent of the alteration in the speed of the screw and the resulting influence on other characteristic parameters.

It will generally be desirable for the width of the discharge opening to be adjusted only after a predetermined tolerance range has been exceeded, in respect of the fluctuations or deviations in the weight of the hollow member. This makes it possible to ensure that minimal fluctuations in weight, which are without practical significance, do not cause a change in the width of the discharge opening.

It may also be advantageous to take account of such deviations or fluctuations in weight, only when they fall within a given weight range, with regard to setting the width of the discharge opening. This is intended to ensure that hollow bodies whose weight lies completely outside the range to be expected are not referred to as a control parameter for the purposes of establishing the width of the discharge opening, as weights which fall totally outside a given range of fluctuation are probably always due to other influences and not therefore the wall thickness of the preform. For example, such a major fluctuation may be due to a waste portion which is normally removed between the operation of removing the hollow member from the mold and the operation of establishing the weight thereof, but which has remained clinging to the hollow member. This could cause an increase in weight which goes far beyond the extend of the usual fluctuations in weight. Taking account of the weights only within a given range in the above-mentioned manner may occur both when forming an average weight from the weights of a plurality of hollow members, and also when comparing the weight of individual hollow members to the desired or reference value. As the operation of forming an average weight presupposes that there is a given number of hollow members whose average weight is to be ascertained, this mode of operation may provide that, when the detected weight is above or below the limits of the given weight range, the weight taken for the purpose of forming the average weight is the respective limit value of the range; in other words, for example when the weight goes above the given range, the upper limit value thereof is used for the operation of forming the average weight. Conversely, when the weight falls below the given range, the lower limit value of the range is used to form the average value.

However, in an alternative, weights of this nature, which fall entirely outside the normal range, can remain totally disregarded.

In addition, the operation of forming an average or mean value from the weights of a group of hollow members which desirably follow each other in succession can be carried out continuously; in that case, after each operating cycle, the respective oldest hollow member of the group which was used for the previous operation of forming the average weight value is replaced by a fresh hollow member, thus providing an up-dating effect in the determination of the average weight value. In this case, an operation of forming the average value and the operation of evaluation and comparison thereof would be effected continuously until a change in the width of the discharge slot occurs. Operation should then be resumed for as many working cycles as may be required in order for hollow members which were produced after the change in the width of the discharge opening and if appropriate after stabilization of the extrusion conditions, to be made available for the operation of forming the above-mentioned average value.

It will be appreciated that it is also possible to take into account for example only each second hollow member in the operation of forming the average value, or when comparing the weight of individual hollow members to the desired or reference value.

In a further embodiment of the present invention, the arrangement may be such that the extent of the change in the width of the discharge opening is dependent on the extent of the deviation of the weight of the hollow member, or the above-mentioned average weight, from the desired or reference weight. The necessary change in the width of the discharge opening may be effected by a preadjustable step in each working cycle, so that it may be necessary to perform a change which extends over two or more working cycles. However, producing the change in a plurality of steps will generally be advantageous, in comparison with a single-step change which is then correspondingly larger, when the consequences of such a large single-step change in the width of the discharge opening, with a corresponding change in the speed of the extrusion screw, can have a serious effect on the operating conditions of the entire system comprising the screw press and the extrusion head, with the result that, once the single-step change has been made, a substantially longer period of time is required for the operating conditions to become restablized. In such cases it may be desirable to set an upper limit so as to define a restricted proportional range of adjustment, so that adjustments below that limit are made proportionally, but over the limit, adjustment is made in steps until the final value is attained.

The change in the width of the discharge opening in dependence on the weight of the hollow members should advantageously be made in the region of the transition between two successive preforms, so that the region or section of the preform which was passing through the discharge opening when the change in the width of the discharge opening was made, falls within a waste portion.

The width of the discharge opening may additionally be adjustable, during the operation of extruding the preform, in accordance with a predetermined program, for the purposes of controlling or varying the wall thickness of the preform over the length thereof. This operation is concerned with adapting the wall thickness for example to the final or definitive configuration of the hollow member. This can be effected by the regions of the preform which are subject to very severe extension during the expansion process in the blow mold being of greater wall thickness than the regions which undergo extension to a less severe extent, so that for example, in spite of the differences in extension of the preform due to blowing thereof, the finished product is still of a substantially uniform wall thickness. In regard to additional control of the wall thickness of the preform in accordance with such a program as mentioned above, a distinction should be made between two control or regulation operations:

In one case, adjustment of the width of the discharge opening is effected by applying the teaching according to the present invention, in order to be able to determine or influence the volume of the material forming the preform, and thus the weight of the finished product, by way of the wall thickness. In the other case, the overall width of the discharge opening is altered during the operation of producing the preform, in dependence on a predetermined program, for the purpose of achieving a given distribution or variation in respect of wall thickness, over the length of the preform. In this respect, it is possible to add the change in the width of the discharge opening, which results from the wall thickness programming. A second possibility is to proportionally vary the changes in the width of the discharge opening, which result from the respective wall thickness program, during the operation of extruding the preform.

It will be appreciated that a change in the width of the discharge opening in dependence on a program as mentioned above for producing a given distribution in respect of wall thickness in the preform over the length thereof, also results in a change in the preform discharge speed. However, there is no necessity for this change to be compensated by corresponding adaptation of the screw speed as the changes in preform discharge speed, which are to be attributed to the wall thickness program, are the same in each operating cycle and thus the duration of the operation for producing a respective preform does not undergo a change, from one working cycle to the other, by virtue of the changes in the width of the discharge opening which are produced by the wall thickness program.

An important advantage of the apparatus in accordance with the teaching of the present invention is that, when a wall thickness program is employed, the programmed distribution in respect of wall thickness on the preform is always in the correct position relative to the blow mold.

DESCRIPTION OF THE PREFERRED EMBODIMENT

Figures 1, 2:
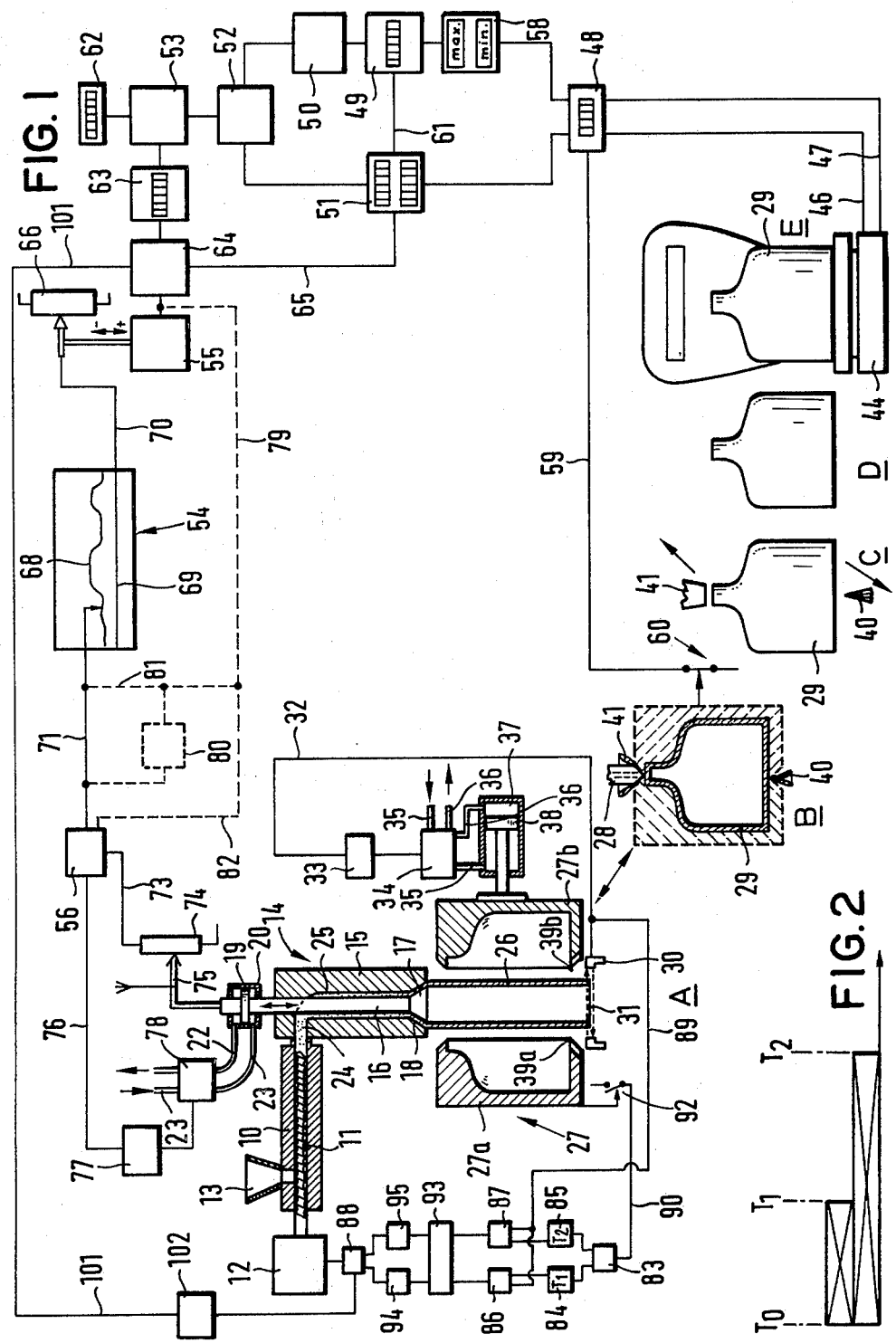
FIG. 1 shows a diagrammatic view of a preferred embodiment of an extrusion blowing apparatus with associated control and regulating means.
FIG. 2 shows a diagram illustrating the waiting time in a receiving station, which is incorporated into the cycle of movement of the blowing mold.

Referring firstly to FIG. 1 of the accompanying drawing, the apparatus illustrated includes an extruder 10 having a screw 11 which is driven in rotation by a motor 12. Thermoplastic material or synthetic resin is introduced by way of a feed hopper 13 into the extruder 10, to the discharge of which is connected an extrusion head 14 essentially comprising a housing 15 and a core 16. The core 16 is arranged to be vertically reciprocable in the housing 15. The lower region 17 of the core 16 forms the inner boundary of a discharge opening in the form of an annular slot 18. In its upper end region, the core 16 is connected to an actuating piston 19 slidable within a cylinder 20 of a piston-cylinder unit. References 22 and 23 denote feed and discharge lines for the pressure medium, which is normally hydraulic fluid, for the unit 19, 20.

The housing 15 of the extrusion head 10 is provided with an intake opening 24 for the material coming from the extruder 10. After the material has passed through the opening 24, the material is distributed around the core 16 and passes through a channel or passage 25 which is defined by the core 16 and the housing 15 and which is of annular cross-section. The passage 25 goes into the annular opening 18 from which the material continuously issues in the form of a tubular preform 26.

The lower region 17 of the core 16 and the wall regions of the housing 15, which are disposed opposite thereto and which co-operate therewith, are of a tapered or conical configuration so that upward movement of the core 16 within the extrusion head 14 would result in a reduction in the width of the discharge opening 18, while a downward movement of the core 16 would increase the discharge opening width.

Arranged below the extrusion head 14 is a blow mold 27 which, as illustrated, comprises two mold sections 27a and 27b. The mold 27 is movable with a reciprocating motion between the position shown in solid lines in FIG. 1 in which it is directly below the extrusion head 14, in a preforming-receiving station indicated generally at A, and a further station B (shown in broken lines in FIG. 1) which is disposed laterally of and downwardly from station A, in which the molded hollow article is removed from the mold 27. In that station B, associated with the mold 27 is a vertically reciprocally movable blowing mandrel 28 for the supply of pressure medium such as pressure fluid for blowing up or expanding the preform 26 to form the hollow member 29. There are also other possible ways of supplying the pressure medium, for example by way of a blowing mandrel which can be introduced from below into the blowing mold and into one end of the preform disposed therein.

Arranged at the underside of the mold 27 in station A is a detecting means such as a photoelectric cell 30, in such a way that the light barrier or beam 31 thereof is interrupted by the lower end of the preform 26 as soon as the preform 26 has reached its reference or desired position. The cell 30 is connected by way of line 32 to a control means 33 operative to control a valve 34 incorporated into feed and discharge lines 35 and 36 of an actuating piston-cylinder unit 37. The signal which comes from the cell 30 when the light barrier 31 is interrupted by the tubular preform causes piston 38 which is slidable in the cylinder of the unit 37 to be subjected to the action of actuating fluid by way of line 36 so that the mold 27 is closed and is then moved into station B. Means (not shown) are provided for transmitting to the mold section 27a, the movement of the mold section 27b connected to the piston 38. It is also possible however, for a separate piston-cylinder unit or other drive means, which could also be controlled by way of the control means 30, to be operatively associated with the mold sections 27 for operative movement thereof. When the mold 27 is closed, the preform 26 is surrounded by the mold sections 27a and 27b. Squeeze and separation edge portions 39a and 39b at the bottom end of the mold sections close off the preform at the lower end thereof, also forming a molded seam, while at the same time a waste portion 40 (shown at Station B) is squeezed off. In normal circumstances, the waste portion 40 remains connected to the hollow member to be produced, by way of a thin film portion. Thereafter, the mold 27 is moved from the preform-receiving station A to the station B so that the space below the extrusion head 14 is freed for the operation of forming the next following preform 26. Directly after the mold 27 has reached the station B, the blowing mandrel 28 is introduced downwardly into an opening disposed at that position in the mold, and into the upper end, which is still open, of the preform 26 in the mold. When this happens, further waste material 41 is squeezed off by the co-operation of the blowing mandrel 28 with the mold sections 27a and 27b. The waste material 41 also normally remains connected to the hollow member 29, by way of a thin film portion.

After the preform 26 has been enlarged or expanded by the blowing agent and after the hollow member 29 produced from the preform 26 has cooled and solidified sufficiently, the blow mold in station B is opened. The hollow member 29 is removed from the mold and passed to a subsequent station C in which waste portions 40 and 41 are removed. This can normally be effected by a simple operation of tearing the waste portions away. Each hollow member may be transferred from station B into subsequent station C and further stations to be described hereinafter, by suitable means, for example in the manner disclosed in German Offenelegungschrift (laid-open application papers) No 17 78 404, the content of which is hereby incorporated herein.

After the hollow member 29 has been removed from the mold in station B, the opened mold is returned to receiving station A, for receiving the next following preform 26.

The hollow members from which the waste portions 40 and 41 have been removed pass by way of an intermediate station D in which for example they are subjected to examination as to whether the waste portions 40 and 41 have actually been removed, on to a weighing apparatus 44 which is disposed in a station E and which establishes the weight of a hollow member. The weighing apparatus has two outputs 46 and 47 connected to a control or regulating circuit which serves to keep the weight of the hollow members constant and as close as possible to a desired or reference value. The control circuit includes a blocking means 48, a weight registering or recording stage 49, an adding stage 50, a counting stage 51 and a division stage 52, a comparison stage 53 being connected to the output of the division stage 52. The arrangement shown also includes a programmer 54, a control or adjusting means 55 for the programmer 54, and a control or regulating stage 56 which compares the actual value of the position of the core 16 to the desired or reference value from the programmer 54.

In each operation of weighing a hollow member 29, the absolute value of the weight of the hollow member is passed from output 47 into the stage 49 at which the number of hollow members 29 to be recorded for comparison in respect of the weight thereof is adjustable. Connected to the input of the stage 49 is a limiting means 58 in which it is possible to set a weight range within which the established weights of the hollow members 29 must lie, if they are to be taken up in the following register or recording stage 49. Any weights which are outside the above-mentioned range remain disregarded when establishing the actual weight or the actual average weight of a plurality of hollow members, or alternatively, such weights which are outside the above-mentioned range are taken into account, in the course of further processing, simply by taking the maximum or minimum value of the above-mentioned range, as appropriate. In other words, if the weight of the hollow member is found to be higher than the above-mentioned range, then the value that may be taken into account, if such weight is not to be totally disregarded, is the maximum limit value of the range. Conversely, if the weight of the hollow member is found to be below the above-mentioned range, then the weight value taken for the purposes of further processing is the minimum limit value of that range.

The outer output 46 of the weighing apparatus 44 is connected to the counting stage 51, also by way of the blocking stage 48. In each weighing operation, provided that the stage 48 is open, a pulse is passed to the counting stage 51 at which the number of weighing operations in respect of which counting is to be effected in order to arrive at the average weight of a plurality of hollow members, can be set. In addition, the counting stage 51 can also be used to set the number of hollow members which remain disregarded for the weight comparison operation, until the arrival of the first one at the weighing station E for the weight comparison operation after adjustment of the width of the discharge opening 18 for the purposes of preform weight correction and possibly any necessary alteration in the speed of the screw 11.

The blocking stage 48 is connected by way of a line 59 to a switching means 60 which is actuated by the mold 27 when it reaches its final or limit position in the station B in which the hollow member is removed from the mold. After the weighing operation and after the result has been produced and a pulse has been passed through the lines 47 and 46 respectively, the blocking member 48 is rendered operative again, for example by termination of actuation of the switch 60 by the mold 27, until, in the course of the following working cycle, the mold 27 returns to the station B and re-actuates the switching means 60. This mode of operation ensures that any forces acting on the weighing apparatus 44 to cause operation thereof between two successive operations of weighing a hollow member do not result in defective outputs. Accidental operation of the weighing apparatus 44 in this way can be caused by unintentionally touching the weighing apparatus or even by the movement of air, when the weighing apparatus 44 is of the degree of sensitivity which is normally required.

It will be understood that the signals for opening and closing the blocking stage 48 can also be produced by a different form of signal source which complies with comparable conditions or requirements in regard to the time of signal output.

When the preselected number of weighing operations as set in the counting stage 51 is reached, a signal is passed to the stages 49 by way of a line 61, with the result that the absolute values which are contained therein, in respect of the preceding weighing operations, are summed in the stage 50 connected to the output thereof. The sum formed therein of all the weights ascertained is divided by the number of weighing operations, in a suitable dividing stage 52 connected to the outputs of the two stages 50 and 51. The average value which is obtained in this way is compared in the comparison and regulating stage 53 to the desired or reference value which is set in the reference stage 62. An alteration in the width of the discharge opening 18, to produce an increase or a reduction therein, is performed in proportion to the magnitude of any difference which may be found between the reference weight value and the average value of the weights calculated or computed by the above-described arrangement.

Connected to the output of the stage 53 is a threshold value stage 63 for setting a limit in respect of the difference between the ascertained weight and the reference weight, such limit being that up to which there is no adjustment of the width of the discharge opening 18 for the purposes of influencing the weight of the preform 26 and thus the hollow member to be produced therefrom. Adjustment of a threshold value serves to suppress slight deviations on the part of the average weight value from the desired or reference value, when such deviations are within the inevitable tolerances, thereby to prevent a regulating operation from being initiated. The magnitude of such a threshold value can also be determined by the working tolerances of the subsequent piece of equipment. However, it may be desirable also for the stage 63 to set maximum sizes of step in the change in the width of the discharge opening 18, so that the alterations to arrive at the desired width required do not cause excessively large alterations in the other operating conditions of the extruder.

Connected to the output of the threshold value stage 63 is a monitoring means 64 for detecting whether, after the comparison operation in the stage 53, a signal for causing an adjustment in the width of the discharge opening 18 was produced. If this is not the case, the counting stage 51 is released by way of a line 65, so as not to set a given number of hollow members which are not to be counted after the discharge opening 18 has been adjusted. In other words, in this case, evaluation of the weighing results is continued without first waiting until the first hollow member 29 produced after the comparison operation had been carried out in the stage 53 has reached the weighing apparatus 44 in station E, after passing through stations B, C and D. If the width of the discharge opening has been altered, the block in the stage 53 is maintained until, by way of the output 46, the number of pulses received is that which corresponds to the preset number of hollow members which are not to be taken into consideration.

The arrangement illustrated also has a control or adjusting motor 55 which co-operates with a potentiometer 66 connected in series with the programming means 54 in which a given program is set in respect of the distribution of the wall thickness of the preform 26 over the length thereof. For the purposes of clearly indicating the situation, two lines 68 and 69 are drawn in the programmer 54, which define the variation in the width of the discharge opening 18 throughout the duration of the operation of extruding the preform. Curve 68 corresponds to the distribution of or variation in the wall thickness on the preform over the length thereof, so that the curve 68 will generally correspond to the section of the preform from which the hollow member 29 is produced in the mold 27. By virtue of adjustment of the potentiometer 66, which is altered in dependence on the deviation of the actual weight from the desired or reference weight, the configuration of the wall thickness as defined by the program in the programming means 54 is expanded or constricted, over the length of the preform, so that the discharge opening correction which is produced on the basis of the weight comparison operation proportionally alters the width of the discharge opening which is predetermined from the wall thickness program.

The connection between the programmer 54 and the potentiometer 66 is by way of line 70. The programming means 54 is also connected to the comparison and control means 56 by way of line 71. The means 56 receives by way of line 73 the actual value in respect of the width of the discharge opening 18, from a potentiometer 74 whose position-indicator means or tapping 75 is connected to the core 16 of the extrusion head 14. The unit 56 is also connected by way of a further line 76 to a control means 77 to control a valve 78 incorporated into the lines 22 and 23 connected to the unit 19, 20.

It is also possible for the signal for controlling the setting of the discharge opening 18, which comes from the monitoring unit 64, to be inputted by way of line 79 into an adding stage 80 where it is added to a signal from the programming means 54 by way of a line 81, for controlling the distribution of or variation in wall thickness, as referred to above. In this arrangement, the adding stage 80 is connected to the input of the stage 56. All the other parts of the arrangement remain unchanged in this modified design, with the exception of omission of the potentiometer 66 and the motor 55.

It will be appreciated that in this form of the arrangement the addition of the signals does not result in such precise account being taken of the change in the width of the discharge opening, as in the case of the above-described proportional change which is produced by means of the potentiometer 66 and the programming means 54. In many cases, however, the degree of accuracy attained will be sufficient.

If no programming action is provided, the output of the monitoring means 64 may be directly connected to the means 56 by way of line 82.

The ideal aim is that the period of time required for producing the preform 26 is the same as the time required by the mold 27 to pass from station A into Station B and back into the initial position in station A, so that, at the moment at which the preform 26 reaches its desired or reference length, the mold takes up its starting position in station A. In operation under practical conditions however, independently of all control interventions, even when the discharge opening 18 is of constant effective width, fluctuations are inevitable in regard to the output capacity of the extruder, that is to say, the amount of material which is discharged from the extrusion head in each unit of time. Therefore, it is necessary to reckon on the possibility of the preform reaching its desired or reference length earlier or later than intended; in this respect it must be assumed that, apart from the operation of closing the mold around the preform 26 in station A, all other movements of the mold and mold sections are performed in dependence on such time. Account is taken of these fluctuations on the one hand by virtue of the mold 27 being closed in dependence on the desired or reference length of the preform. In order to ensure that, when the preform issues at an excessively high speed, the preform does not become too long because, at the moment of reaching its desired length, the blowing mold 27 is still not in its starting position in station A, a short waiting time can be introduced into the blow mold working cycle so that the mold which, apart from the closing operation, is controlled in dependence on time, takes up its starting position in station A, a short period of time before the theoretical moment at which the preform 26 will reach its desired or reference length.

Moreover, irrespective of the setting of the discharge opening 18 and a resulting change in the speed of discharge of the preform, the speed of rotation of the screw 11 and thus the speed of discharge of the preform 26 and, as a result, the period of time required for establishing same, will be kept as constant as possible, by way of a suitable control means. This control means is provided by a time counter 83 having two outputs to which two timing members 84 and 85 are connected in parallel. The timing member 83 is set to a first time T1 while the timing member 85 is set to a later time T2. T1 denotes the moment in the course of a working cycle at which, when the extruder 10 is operating in absolutely the correct fashion, the preform 26 reaches its desired length and triggers the closing moment of the mold 27. Respective comparison units 86 and 87 are connected to the outputs of the respective timing members 84 and 85. In addition, the two comparison units 86 and 87 are connected by way of line 89 to the cell 30. The time counter 83 is connected by way of line 90 to a switch means 92 or the like which is actuated by the mold 27 or one of the mold sections 27a and 27b, as soon as the mold 27 occupies its initial position in station A, at time T0. Switching of the time counter 83 at time T0 by the signal of the switching means 92 fixes the times T1 and T2 in the timing members 83 and 85. Even if the preform 26 should reach its desired length before time T1, it finds the mold 27 in its initial position in station A, as the mold 27 had already arrived at station A at time T0 (see FIG. 2). The only necessity is that the distance or time interval between the two times T0 and T1 should correspond to the usual inevitable fluctuations in the screw press. In normal operation, these fluctuations are within such close limits that there is no serious time loss due to the mold 27 passing into the station A at the earlier time T0.

When the time T1 set in the timing member 83 is reached, the timing member 84 passes a signal to the comparison means 86. Likewise, the timing member 85 passes a signal to the comparison means 87 when the set time T2 is reached. If the signal from the cell 30, which indicates that the preform 26 has reached its desired length, arrives later than the envisaged or intended time T1, the extruder speed of rotation remains unchanged, on the assumption that the above-mentioned signal arrives before T2 as set in the timing member 85. In other words, in this case, neither of the comparison members 86 and 87 passes a signal to the means connected to the output thereof. If however the signal from the cell 30 arrives before time T1, the comparison member 86 operates a switching unit 94 which is connected downstream thereof and which reduces the speed of rotation of the motor driving the press screw 11, by way of a suitable control member 88 such as a motorized potentiometer, an adjusting motor or the like.

If the signal from the cell 30 arrives later than the time T2 as set in the timing member 85, the comparison member 87 produces a signal which, by way of the switching means 95 disposed downstream thereof, acts on the control member 88 in such a way as to increase the speed of rotation of the motor 12 and thus the screw 11. An intermediate unit 93 is provided for establishing the magnitude of the correction, that is to say, the extent to which the speed of rotation of the motor 12 is to be reduced or increased, in the case of a signal requiring an alteration in the operating conditions of the press.

Any signals which come from the cell 30 between times T1 and T2 do not have any effect on the speed of rotation of the screw 11.

The above-described control means is capable of detecting changes in the discharge speed of the preform 26 and thus the time which is required for the preform 26 to reach its desired length, and also producing the corresponding control operations in order for the time required for producing the preform 26 to be kept at least approximately constant, by way of a change in the speed of rotation of the screw 11. This also applies in regard to such changes in the discharge speed which are caused by a variation in the width of the discharge opening, for the purposes of adapting the weight of the hollow member to the desired or reference weight. It is also possible however for the change in the discharge speed of the preform 26 from the annular slot 18, which normally occurs when the width of the discharge slot is adjusted, to be produced directly, that is to say, without the interposition of the control means 83 to 87. For this purpose, a line 101 from the stage 53 or one of the stages connected downstream thereof, may be connected by way of an interposed control unit 102 to the control member 88, so that, when a difference is detected between the reference or desired value and the actual value of the weight of the hollow member, in the means 53, a corresponding signal is applied to the control member 102 which produces the necessary influence on the speed of rotation of the screw 11, by way of the control member 88. The advantage of such an arrangement may be that, under normal operating conditions, it is possible to produce changes in the width of the discharge opening and adaptation of the speed of screw rotation, more or less simultaneously, so that there is no deviation from the desired discharge speed, or a deviation of only a smaller degree, in production of the preform 26, following the change in the width of the discharge opening. Otherwise, if the change in the preform discharge speed caused by the change in the width of the discharge opening were to be detected by the control means 80 to 87, this would be possible no earlier than in the subsequent operating cycle so that it would be necessary to wait for a further operating cycle, until the weighing operation in station E was begun, before the first hollow member in station E could be weighed, after conclusion of the alteration in the width of the discharge opening and conclusion of the operation of adapting the operating conditions in the screw press to the change in width of the discharge opening.

When the detected weights of individual hollow members are compared to the desired or reference weight without a preceding operation of forming an average weight from a number of individual members, the detected weight of the hollow member would be introduced directly into the stage 53. The counting stage 51 would then only perform the function of counting the working cycles during which no weighing operation is carried out, after a change in the discharge opening width.

A similar situation also arises if, when forming an average weight in the stage 49, after each weighing operation, the weight which has just been established is recorded and therefore the weight which was ascertained in the earliest preceding weighing operation is cancelled. In this case, a comparison is made after each working cycle, as long as no adjustment of the discharge opening is made. The number of hollow members which form a group for the purposes of establishing the above-mentioned average weight would then be set in the stage 49.

It will be appreciated that the above-described process and apparatus may be modified in many ways, as by substitution of equivalents and the like, without thereby departing from the spirit and scope of the present invention.

What is claimed is:

1. Apparatus for maintaining substantially constant the final weight of a hollow member which is made from a thermoplastic material by an extrusion blowing process wherein a preform is continuously extruded through a discharge opening of an extrusion pressing head connected to an extrusion press and blown in a mold means, comprising means for determining the final weight of a said hollow member after leaving the mold means and comparing said final weight to a reference value representing desired weight, means for increasing or decreasing the size of said discharge opening in response to the comparison operation such that the volume and therefore the weight of the preform increases when said final weight is less than said reference value and decreases when said final weight is greater than said reference value, means for detecting when the length of the preform has reached a preselected length, said detecting means being operable to initiate closure of the mold means about the preform, and control means for maintaining substantially constant the time to extrude said preform to said preselected length.

2. Apparatus as set forth in claim 1 wherein the control means includes means for regulating the speed of extrusion of the preform.

3. Apparatus as set forth in either of claims 1 or 2 wherein the press is a screw press.

4. Apparatus as set forth in claim 3 wherein the control means includes means for regulating the speed of rotation of the screw of the press.

5. Apparatus as set forth in claim 4 wherein the speed of rotation of the screw of the screw press varies directly with the change in the size of the discharge opening.

6. Apparatus as set forth in claim 1 including means for increasing or decreasing the size of said discharge opening only when the deviation in the final weight of the hollow member from said desired weight exceeds a predetermined tolerance range.

7. Apparatus as set forth in claim 1 including limiting means for causing only deviations in the final weight of said hollow member from said desired weight which are within a given range to be used for increasing or decreasing the size of said discharge opening.

8. Apparatus as set forth in claim 7, wherein said limiting means assigns to a said deviation outside of said given range the value corresponding to the respective limit of said range for increasing or decreasing the size of said discharge opening.

9. Apparatus as set forth in claim 1 including means for continuously determining the final weight of said hollow members and comparing said final weights to said reference value until the result of the comparison operation does not require a change in the size of said discharge opening.

10. Apparatus as set forth in claim 1 including means for continuously determining the final weight of groups of said hollow members and comparing said final weights to said reference value until the result of the comparison operation does not require a change in the size of said discharge opening.

11. Apparatus as set forth in claim 1 including means for producing a signal when the number of times the final weight of the hollow members is outside the limits of a predetermined range exceeds a selectable number.

12. Apparatus as set forth in claim 1 including means for increasing or decreasing the size of said discharge opening in direct proportion to the magnitude and direction of the deviation of the final weight of the hollow member from said reference value.

13. Apparatus as set forth in claim 1 including means operable to increase or decrease the size of said discharge opening between two successive preforms.

14. Apparatus as set forth in claim 1 including means for increasing or decreasing the size of said discharge opening in a stepwise manner.

15. A system for producing a hollow member from thermoplastic material by extrusion blowing, comprising:

(a) an extrusion press;
(b) an extrusion means connected to the output of the extrusion press and providing a variable size discharge opening for producing a preform;
(c) mold means for receiving the preform and means for inflating the preform therewithin to form a said hollow member;
(d) means for determining the final weight of the hollow member after leaving the mold means and comparing said final weight to a reference value representing desired weight;
(e) means for increasing or decreasing the size of the discharge opening in response to said comparison operation such that the volume and therefore the weight of the preform increases when said final weight is below said reference value and decreases when said final weight is above said reference value;
(f) means for detecting when the length of the preform has reached a preselected length, said detecting means being operable in response thereto to initiate closure of the mold means about the preform; and
(g) control means for maintaining substantially constant the time to extrude said preform to said preselected length.

16. A system as set forth in claim 15 wherein said control means is operable to regulate the speed of extrusion of the preform.

17. A system as set forth in claim 15 wherein the speed of extrusion of the extrusion press and the size of the discharge opening are variable in an interdependent mode.

18. A system for producing hollow members from thermoplastic material by extrusion blowing, comprising:

(a) an extrusion press;
(b) an extrusion means connected to the output of the extrusion press and providing a variable size discharge opening for producing performs;
(c) mold means for receiving the performs and means for inflating the preforms therewithin to form said hollow members;
(d) means for determining the mean weight of a plurality of successive hollow members after leaving the mold means and comparing said mean weight to said reference value representing desired weight;
(e) means for increasing or decreasing the size of the discharge opening in response to said comparison operation such that the volume and therefore the weight of the performs increases when said mean weight is below said reference value and decreases when said mean weight is above said reference value;

(f) means for detecting when the length of the performs has reached a preselected length, said detecting means being operable in response thereto to initiate closure of the mold means about the performs; and (g) control means for maintaining substantially constant the time to extrude said performs to said preselected length.

* * * * *